(12) United States Patent
Cannon et al.

(10) Patent No.: US 6,269,159 B1
(45) Date of Patent: Jul. 31, 2001

(54) CONFERENCING WITH A CALLING PARTY

(75) Inventors: Joseph M. Cannon, Harleysville; James A. Johanson, Emmans, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/060,373

(22) Filed: Apr. 15, 1998

(51) Int. Cl.[7] .................................................. H04M 1/57
(52) U.S. Cl. ......................... 379/202; 379/202; 379/215; 379/201; 379/205
(58) Field of Search .......................... 379/93.02, 93.03, 379/93.04, 202, 203, 204, 205, 206, 215, 218, 142, 35

(56) References Cited

U.S. PATENT DOCUMENTS

| | | | |
|---|---|---|---|
| 4,796,293 | * | 1/1989 | Blinken et al. ..................... 379/202 |
| 5,550,908 | * | 8/1996 | Cai et al. ........................... 379/215 |
| 5,563,882 | * | 10/1996 | Bruno et al. ......................... 370/62 |
| 5,583,925 | * | 12/1996 | Berstein ............................. 379/202 |
| 5,619,561 | * | 4/1997 | Reese ................................ 379/215 |
| 5,673,080 | * | 9/1997 | Biggs et al. ........................ 379/202 |
| 5,680,447 | * | 10/1997 | Diamond et al. .................... 379/215 |
| 5,805,677 | * | 9/1998 | Ferry et al. ......................... 379/142 |
| 5,812,534 | * | 9/1998 | Davis et al. ........................ 370/260 |
| 5,825,867 | * | 10/1998 | Epler et al. ........................ 379/215 |
| 5,828,742 | * | 10/1999 | Khalid et al. ....................... 379/215 |
| 5,960,069 | * | 9/1999 | Felger ................................ 379/145 |
| 5,982,774 | * | 11/1999 | Foladare et al. .................... 379/215 |
| 5,999,613 | * | 12/1999 | Nabkel et al. ...................... 379/215 |

\* cited by examiner

Primary Examiner—Ahmad Matar
Assistant Examiner—William J. Deane, Jr.
(74) Attorney, Agent, or Firm—William H. Bollman

(57) ABSTRACT

A method and apparatus to provide three way conferencing which allows a third party caller to call into an existing telephone call at a single line of a called party's telephone. In one embodiment, the called party may accept the conferencing of the third party caller based on a review of received call related information, e.g., Caller ID information. The acceptance may be by flashes of the telephone line and/or by entry of a predetermined DTMF code. The telephone apparatus and/or the central office may maintain a directory of accepted third party callers which are allowed to automatically enter an existing telephone call at a called party, unless refused by the called party within a predetermined amount of time. Each entry in the directory of accepted third party callers contains a portion or all of call related information such as a telephone number and/or a household name.

9 Claims, 11 Drawing Sheets

CONFERENCING WITH A CALLING PARTY

BACKGROUND OF THE INVENTION

1. Field of the Invention

This invention relates generally to three party calling services. More particularly, it relates to apparatus and methods to add a calling party into an existing telephone call.

2. Background of Related Art

Telephone services and advances therewith continue to be in demand in today's society. For instance, cellular telephones have provided users with the ability to place or receive telephone calls while in a car or walking down a street. Along with these advances and demands came the ability for three way conferenced calling.

Conventional three way conferenced calling enabled one party already established in a telephone call with a second party to place a second telephone call to a third party, and then to conference the two separate telephone calls together into a single three way telephone call. To enable parties having only one telephone line to initiate a three way conference call, the two separate telephone calls were conferenced at a telephone switch, e.g., private branch exchange, either at the customer's premises or at the central office of the telephone company, and then transmitted to the initiating party on the single telephone line.

FIG. 8 shows a conventional method 600 of accomplishing three way conferenced calling at a central office telephone switch, and FIGS. 9A to 9C show corresponding states of the conference call.

In particular, in step 602, a telephone call is established between party A and party B, each party having a single telephone line or only using a single telephone line of a multi-line telephone. The telephone call between party A and party B is depicted in FIG. 9A.

In step 604, at least one of the parties in the telephone call established in step 602 has three way calling service, e.g., party A. That party flashes the telephone line to indicate to the switch that the current party (e.g., party B) is to be put on hold, and a dial tone is to be presented to the flashing party, e.g., party A.

In step 606, the three way initiating party, e.g., party A, dials out to or calls a third party C, and establishes a telephone call between party A and party C. This is depicted in FIG. 9B, wherein party B is on hold and party A calls out to party C.

In step 608, party A flashes the telephone line again to indicate to the switch to conference together the telephone call to party B with the telephone call to party C, and to present the same to party A as a single telephone call. Thus, a three way call is established between parties A, B and C, as depicted in FIG. 9C.

The conventional technique of three way calling is convenient and addresses expanding needs for services to a one line telephone. However, the conventional technique requires the initiating party, e.g., party A, to call or dial the telephone number of the third party C while the other party is placed on hold.

There is thus a need for three way conferencing which allows a third party to call into an established telephone call between two other parties.

SUMMARY OF THE INVENTION

In accordance with the principles of the present invention, a telephone conferencing control apparatus comprises a call related information receiver. A memory is adapted to receive at least one entry relating to call related information regarding a third party caller allowed to enter an existing telephone call. A processor compares call related information received by the call related information receiver to the at least one entry in the memory, and allows a third party caller regarding the call related information to enter the existing telephone call if a match is determined by the comparison.

A method of conferencing a third party caller into an existing telephone call in accordance with another aspect of the present invention comprises providing an indication of a telephone call from a third party caller to a called party already engaged in an existing telephone call. The third party caller is added to the existing telephone call at the called party.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an advanced three way calling method and apparatus which allows the conferencing of a calling third party C into an established telephone call between two parties A and B.

FIGS. 1 and 2A to 2D show three (or more) way conferencing in accordance with the principles of the present invention.

Figure 1:
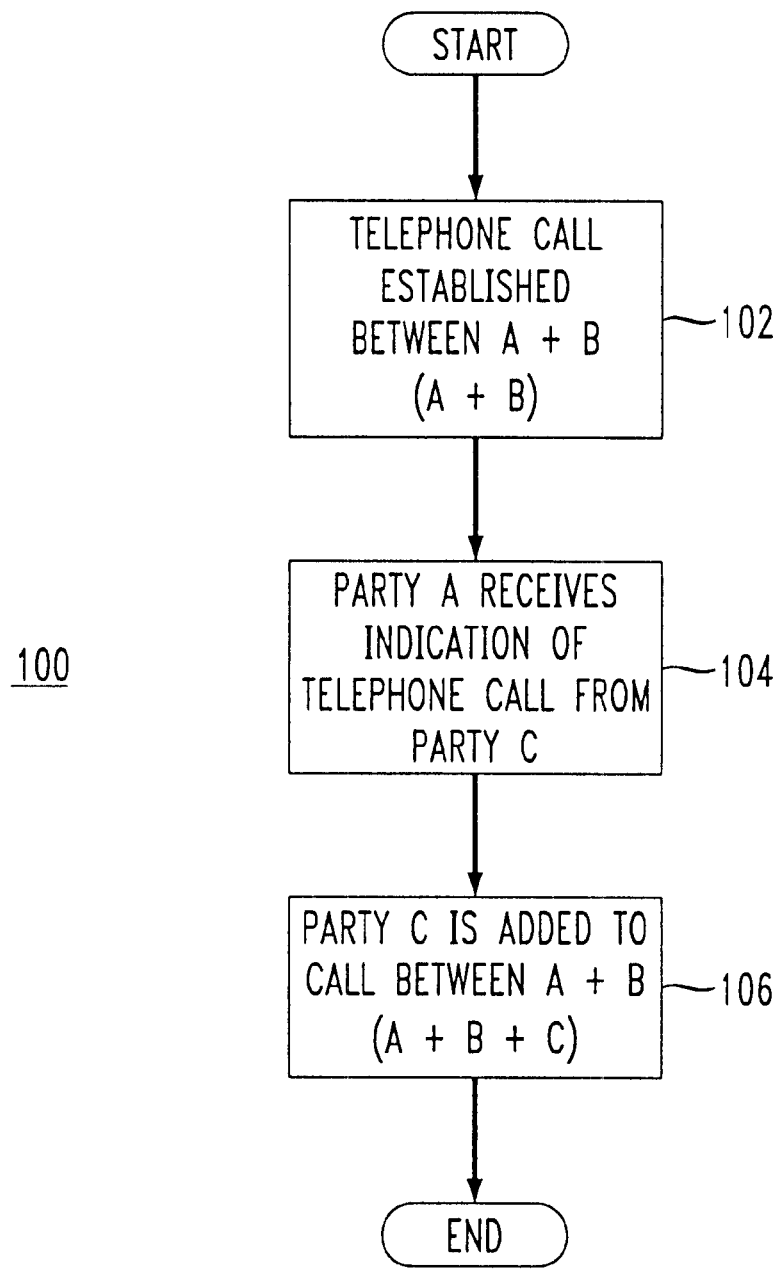
FIG. 1 shows a method of allowing a calling third party C into an established telephone call between two parties A and B, in accordance with the principles of the present invention.
Figure 2A:
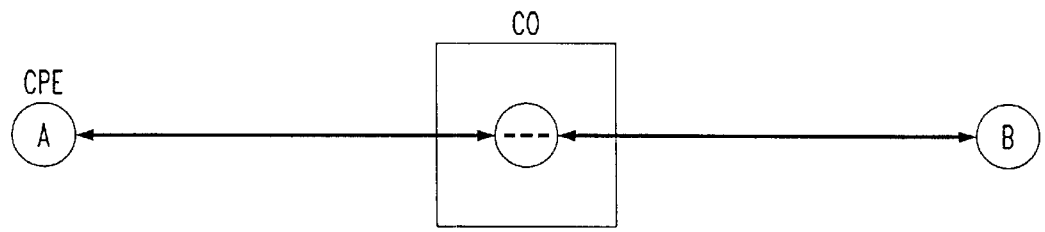
FIGS. 2A to 2D depict the steps of the method according to the embodiment shown in FIG. 1.
Figure 2B:
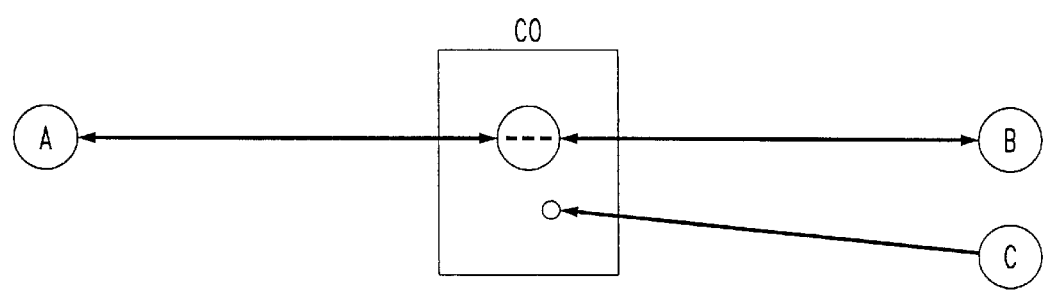

In particular, FIG. 1 shows that a first step or concept 102 of the three way conferencing is the establishment of a telephone call between two parties, e.g., party A and party B. This may be accomplished in any conventional manner, including party A calling party B or party B calling party A. The telephone call between party A and party B is depicted in FIG. 2A.

After a telephone call is established between two (or more) parties A and B, party A is then able to receive a three way conferencing call.

With one telephone call established and active between party A and party B, party A receives an indication of a telephone call from a third party C. The indication in the preferred embodiment is call related information received from a central office, e.g., Caller ID information. The state of the conference call is depicted in FIG. 2A.

Caller ID is a well known service in the United States which typically provides the telephone number and household name information about a calling party (e.g., party C) to a called party (e.g., party A) before the call is answered. Basic call related information is transmitted from the local telephone company to the called party A while the called party's telephone is in a hung-up or on-hook state, e.g., between the first and second rings. Based on a display or other indication regarding the call related information, a called party A at a conventional telephone may decide to not answer the incoming call.

Another telephone company service which has become well known and popular is that which allows a third party caller (e.g., party C) to call another party (e.g., party A) when the other party A is already off-hook, i.e., already in an established telephone call with another party (e.g., party B). This service is currently known in the United States as Call Waiting. Call Waiting allows a party, e.g., party A, who is already using the telephone (i.e., in an off-hook state), to receive an audible interruption, click or other indication at the customer premises equipment that another person is calling, and then to establish a connection with the third party caller as desired by placing the first party on hold, e.g., by flashing the telephone line.

More recently, call information has been combined with third party caller services to provide an advanced service currently known in the United States as Calling Identity Delivery on Call Waiting (CIDCW). CIDCW service allows a customer, while off-hook on an existing call, e.g., between two parties A and B, to receive information about an incoming calling party (e.g., party C) on a waited call before answering that incoming call waiting call. Transmission of the third party's call information with this service takes place almost immediately after the customer premises equipment (CPE) is alerted to the availability of call related information with a CPE Alerting Signal (CAS). The CAS is a short burst of a combination of high frequencies that are appended to the Subscriber Alerting Signal (SAS) otherwise known as the "Call Waiting Tone". Using CIDCW, a user can decide whether or not to answer a third party incoming call waiting call.

At any time after a called party (e.g., party A) having CIDCW service has been alerted to the availability of call information for an incoming call waiting call and while a party (e.g., party C) is still in the waited state, CIDCW allows the customer to flash the switch hook to retrieve the waited call while placing the first caller (e.g., party B) on hold, and subsequently to go back and forth between the current far-end party (e.g., party C) and the held party (e.g., party B) by flashing. CIDCW provides all the capabilities associated with the current CW service, with the additional capability of providing CID data to a customer on waited calls. Therefore, CIDCW is considered an enhancement of the CW service. A telephone line may either have call waiting (CW) or CIDCW service enabled, but not both at the same time.

Thus, CID is a service which provides display or other data to a telephone regarding a calling third party, allowing the user to make a decision as to whether or not to answer an incoming call.

Figure 2C:
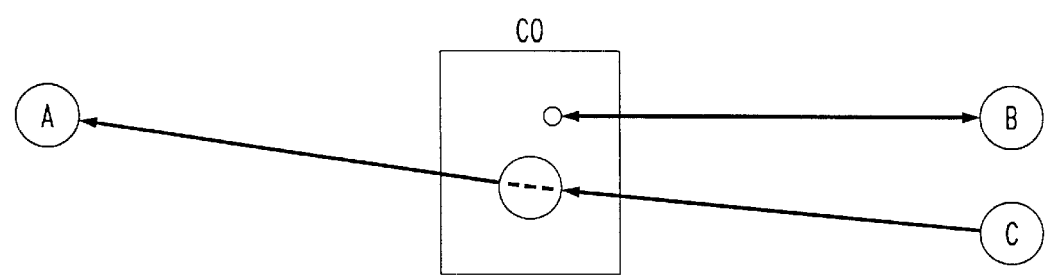
Figure 2D:
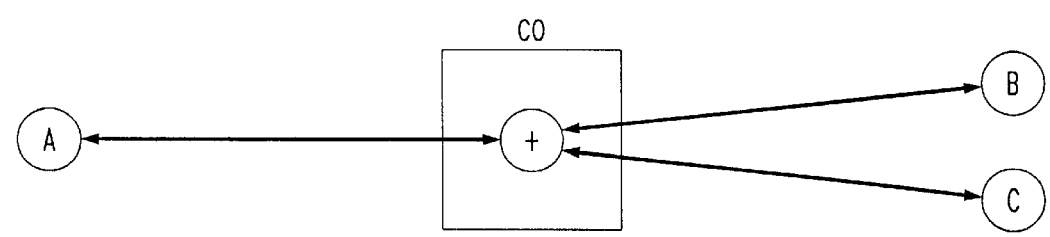

In step 106 of FIG. 1, based on the indication regarding the calling party C, party A adds party C to the existing telephone call established between party A and party B. Thus, whereas conventional three way conferenced calling only allowed a party to an existing telephone call to dial out to a third party to establish a three way conferenced call, the present invention allows a third party caller to enter an established call to initiate a three way conference. FIG. 2C depicts party A's acceptance of a point-to-point telephone call from party C while party B is on hold at the central office (CO), and FIG. 2D depicts the established conference call between party A, party B and party C.

Figure 3:
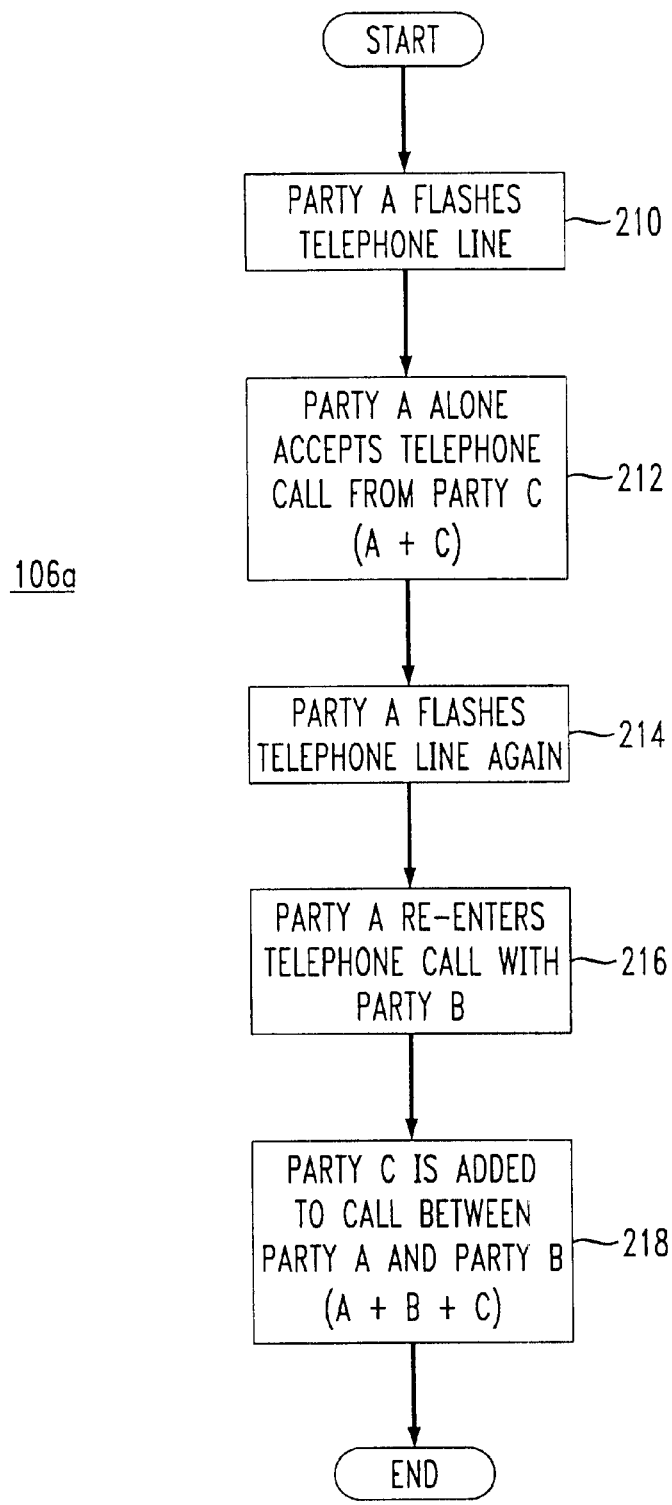
FIG. 3 shows a first embodiment of the allowance of a third party C into an established call between two parties A and B.

FIG. 3 shows the step 106 of adding the calling third party C to the established two way call between party A and party B in more detail.

In particular, upon receiving an indication that party C is calling, party A may flash the telephone line in step 210 to place the current party B on hold.

In step 212, party A accepts the telephone call from party C, thus establishing a two way telephone call with party C. At this time, party B is on hold at the switch for the benefit of party A.

In step 214, party A again flashes the telephone line, this time to place party C on hold, and re-enters the telephone call with party B as shown in step 216.

In step 218, party A adds or conferences the telephone call from party C with the telephone call to party B, e.g., by flashing the telephone line a third time.

Accordingly, party A is able to receive a call from party C and to allow that party C to enter into a three way conference with party B.

Other techniques to signal a switch to allow a third party C to call into an established telephone call between two parties A and B are possible.

Figure 4A:
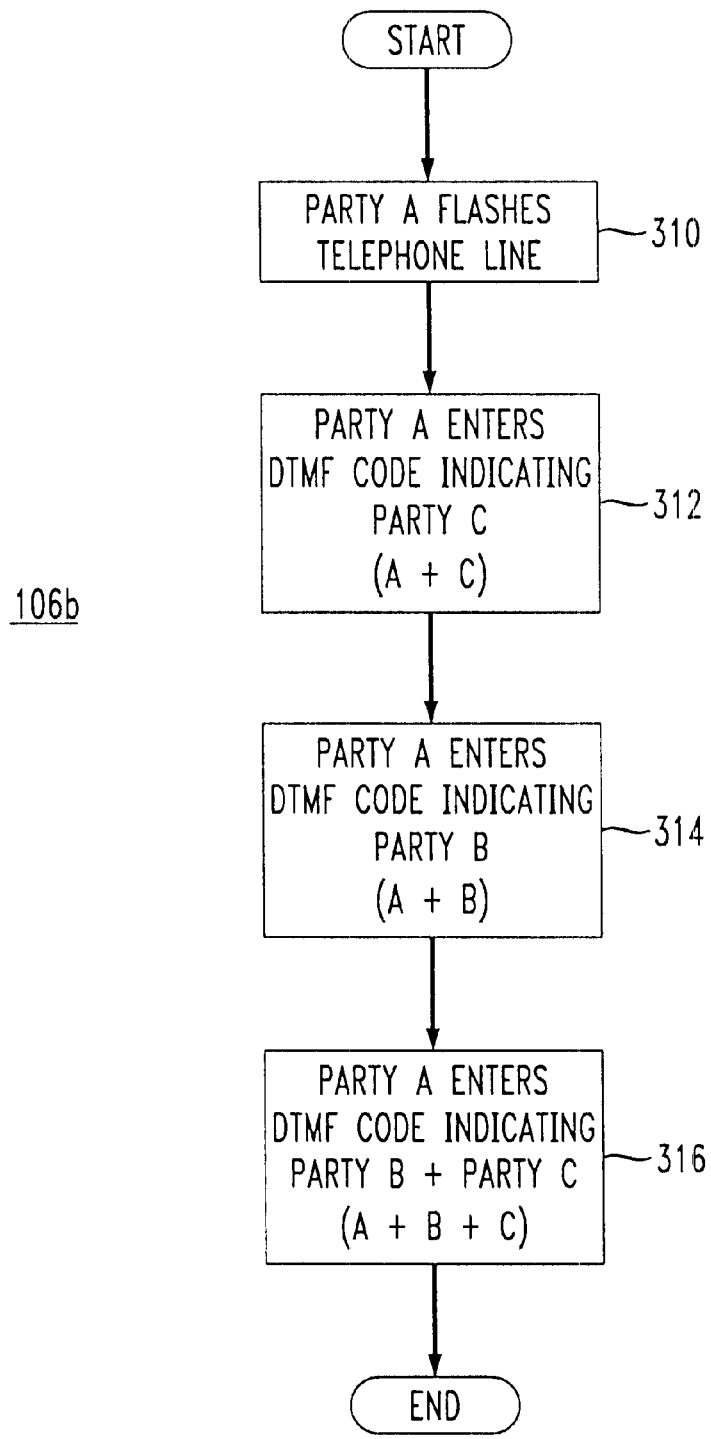
FIGS. 4A to 4C show other aspects of another embodiment of the present invention wherein a third party C is allowed into an established call between two parties A and B.
Figure 4B:
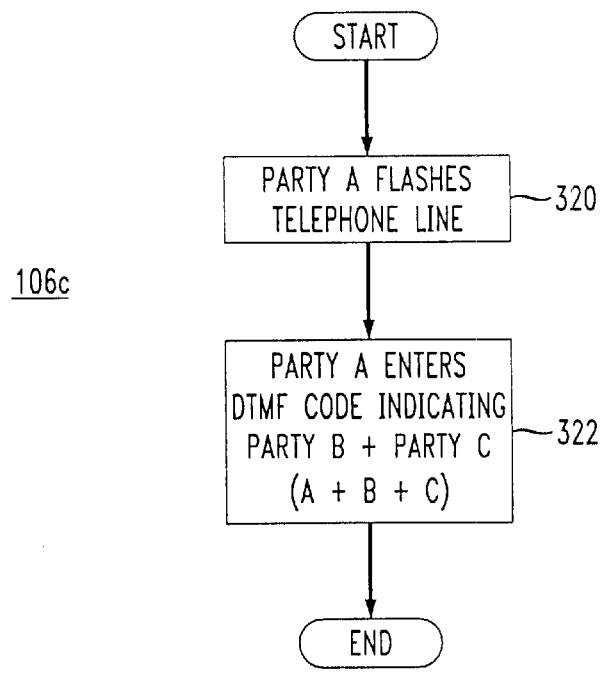
Figure 4C:
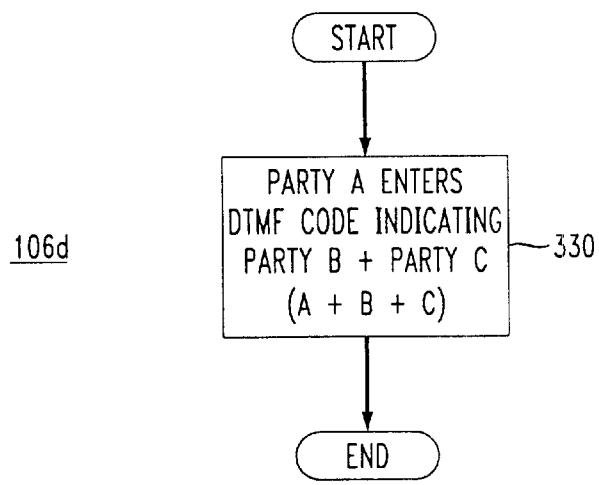

For instance, FIGS. 4A to 4C show three scenarios or aspects using dual tone multi frequency (DTMF) tones to signal the switch to allow the party C to enter an established call between two other parties A and B, in accordance with another embodiment of the present invention.

In particular, FIG. 4A shows in more detail an embodiment for step 106 shown in FIG. 1. The detailed process 106b shown in FIG. 4A includes the use of DTMF tones to control the switch.

In FIG. 4A, party A flashes the telephone line in step 310 to connect party A with the switch. In step 312, party A enters a predetermined DTMF code via the keypad of their telephone to indicate acceptance of a call from party C and thus to establish a telephone call with party A. For instance, the key sequence "#2" as transmitted from party A using DTMF tones may indicate to the switch to place the current caller (e.g., party B) on hold and to answer the incoming call from party C.

In step 314, party A enters a predetermined DTMF code corresponding to an instruction to the switch to return to the held telephone call with party B. For example, the key sequence "#1" may indicate to the switch to place the current caller (e.g., party C) on hold and return to the already established call with party B.

As depicted in step 316, party A may enter a predetermined code, e.g., '#3', corresponding to an instruction to the switch to establish a conference between the telephone calls to party B and party C. In response, the switch will establish a telephone connection, i.e., a conference, between the telephone line to party B and the telephone line to party C, and pass the conferenced call to party A on a single telephone line to establish a three way call between party A, party B and party C.

FIGS. 4B and 4C show flexibility in the embodiment shown in FIG. 4A.

In particular, FIG. 4B shows an alternative scenario of the embodiment shown in FIG. 4A wherein in step 320 party A flashes the telephone line to place party B on hold. Thereafter, in step 322, party A may skip the formalities of first talking in a two way call with party C before allowing party C into the established telephone call with party B. Instead, the three way call may be immediately established under the instruction of party A.

For instance, party A may enter a predetermined DTMF code after the telephone line is flashed in step 320 to instruct the switch to establish a conference between party A, party B and party C. This instruction may be issued immediately upon receiving the indication that party C is calling, or after speaking with party C. This feature is particularly applicable with the use of Caller ID, and when party A recognizes and accepts the telephone number and/or household name of party C being displayed on a Caller ID display.

The embodiment shown in FIG. 4B shows a flash of the telephone line in step 320 to invoke a routine at the switch which will monitor the telephone line from party A for DTMF tones. Alternatively, the telephone line from party A could be continuously monitored for the presence of DTMF tones, and the requested actions can be performed upon receipt by the switch of the same.

For instance, step 330 of FIG. 4C shows that party A, without flashing the telephone line, simply enters the predetermined DTMF code using the keypad of their telephone to instruct the switch to accept the call from party C, to conference the telephone line from party B with the telephone line from party C, and to present the same to party A on a single telephone line, to thus establish a three way conference between party A, party B and party C. Thus, using a continuous DTMF decoder, a three way conference with a calling party C can be established quickly by party A.

The embodiment of FIG. 4C requires a fairly robust DTMF decoding routine to overcome and avoid erroneous detection of DTMF tones in the presence of voice. One method to improve the robustness of the DTMF decoder is to lengthen the number of characteristics in the predetermined code, e.g., require more than a single keypress, with a maximum time allowed between each keypress. For instance, an instruction "#3" would allow a more robust detection of the DTMF tones than would "3".

Moreover, the predetermined code can be established to have an "alerting" DTMF tone, such as is provided by a keypress of "#", followed by an instruction keypress such as "3". Alternatively, the "alerting" DTMF tone could be any key intended only to alert or wake up a DTMF decoding routine, followed by a command or instruction DTMF tone.

Figure 5:
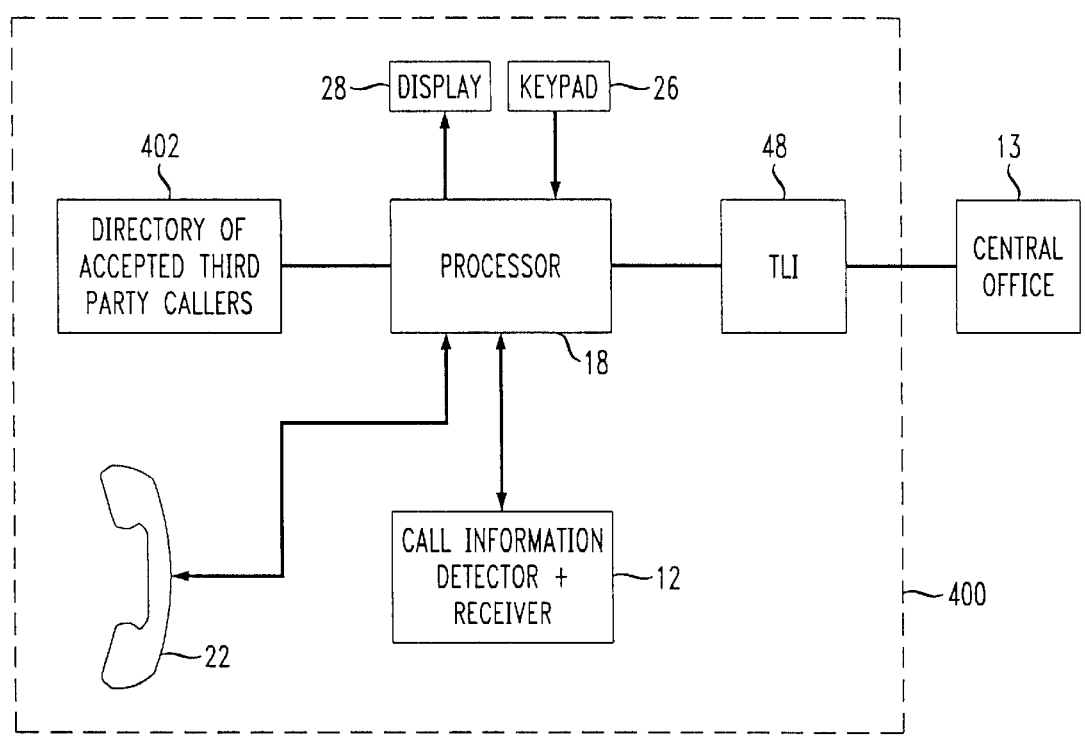
FIG. 5 shows a telephone including a directory of accepted third party callers, in accordance with a third embodiment of the present invention.

FIG. 5 shows an embodiment of a customer premises equipment, i.e., a single line telephone 400, including a directory of accepted third party callers 402, in accordance with another embodiment of the present invention.

In particular, the telephone 400, which interfaces to a telephone line from a central office 13, includes a telephone line interface (TLI) 48. A processor (e.g., a microprocessor, microcontroller, and/or digital signal processor (DSP)) 18 receives input from a local alphanumeric keypad 26. A call related information detector and receiver 12 receives call related information (e.g., Caller ID information) from the central office 13, and provides the same to the processor 18 for display on the display 28. A conventional handset 22 is also interfaced to the telephone line via the TLI 48 and/or the processor 18.

Inventively, the telephone 400 additionally includes a directory of accepted third party callers 402. The directory of accepted third party callers 402 is formed in a portion of memory, e.g., non-volatile memory such as Flash memory. Alternatively, the directory of accepted third party callers 402 can be maintained at the central office 13 for the benefit of the user of the telephone 400. The directory of accepted third party callers accepts one or more entries including call related information regarding accepted third party callers who are permitted to automatically conference into an existing call at the called telephone 400.

The entries in the directory of accepted third party callers 402 are pre-stored by the user of the telephone 400. The entries are entered into the directory of accepted third party callers 402 through keypresses on the keypad 26 and displayed on display 28 as they are being entered. The processor 18 provides prompts to the user on the display 28 to assist in the entry of each of the pre-stored accepted third party callers.

Each entry in the directory of accepted third party callers 402 includes call related information relating to any desired third party, e.g., a telephone number, a household name, etc. The entry may include the entire telephone number and/or household name, or only a portion of the telephone number and/or household name. For instance, an entry in the directory of accepted third party callers 402 may include only an area code of a telephone number from which a third party caller may automatically be conferenced into an existing telephone call at the called telephone. Alternatively, the entry may indicate only a last name of those households allowed to automatically conference into an existing telephone call at the called telephone.

For instance, a call from party C having a telephone number of (800) 555-1212 will be automatically conferenced upon a match between the call related information of a calling party and an entry in the directory of accepted third party callers 402. The match is determined by the processor 18, which compares information obtained from the call information detector and receiver 12 and the entries in the directory of accepted third party callers 402. If no match is found, then the calling party will not be allowed to automatically enter the established telephone call at the called telephone.

Upon automatic conferencing into the existing telephone call, an alerting tone may be provided by the central office to the called party. The alerting tone may be provided simultaneous with the conferencing of the third party, or it may be provided before the third party is automatically conferenced. In this case, the central office may provide the alerting tone and, for a predetermined amount of time, e.g., for 3 seconds, await a refusal signal from the called party. The refusal signal may be a predetermined DTMF tone, e.g., the "*" key. If the alerting tone is not refused by the called party within the predetermined amount of time, the central office will proceed to automatically conference the third party into the existing telephone call to or from the called party.

Thus, the calling party, e.g., party C, will either be allowed to conference into an existing telephone call at the called party in accordance with the embodiments shown in FIGS. 1 to 4C, or the calling party C will be handled in a conventional manner, e.g., provided with a busy signal.

Figure 6:
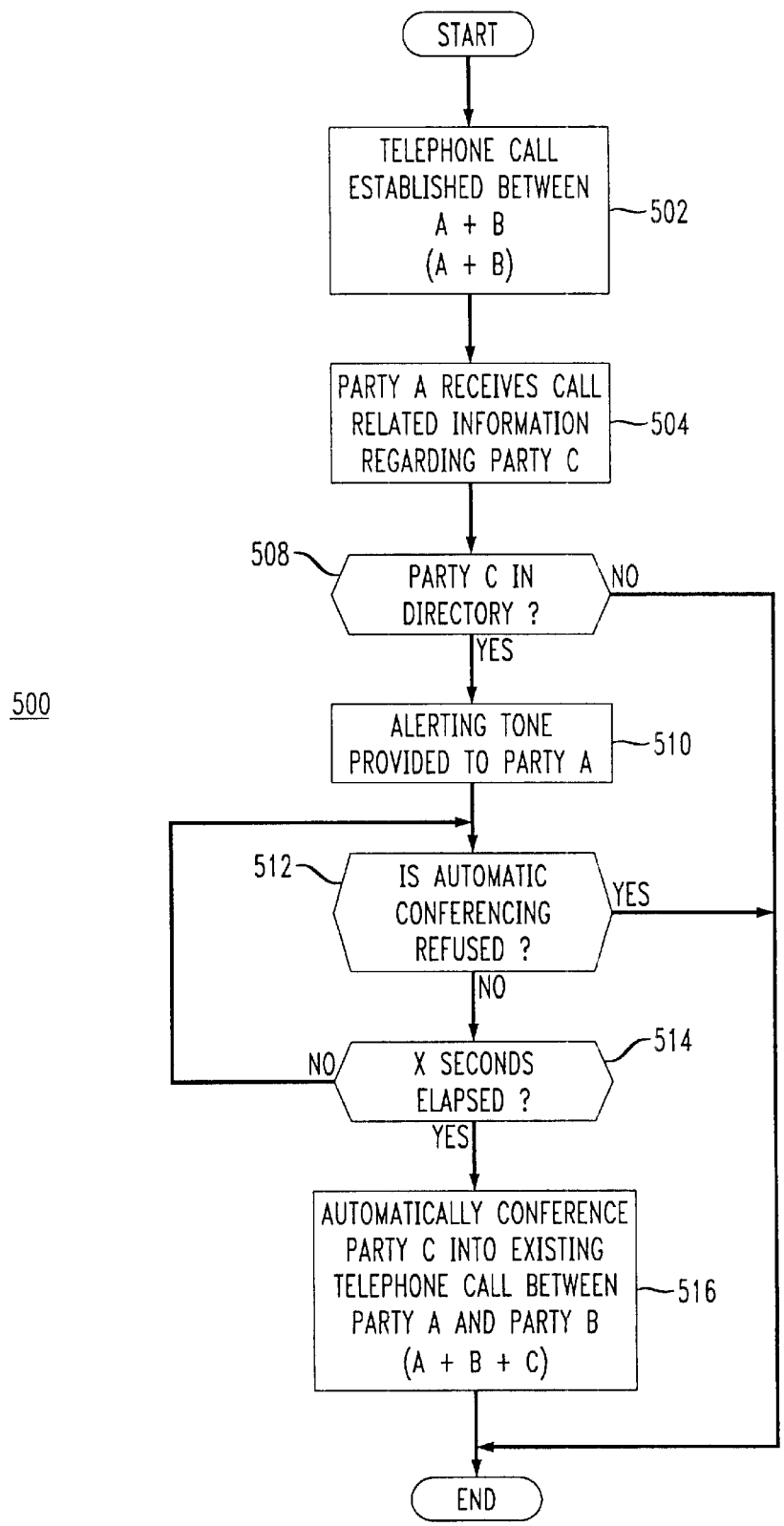
FIG. 6 shows a method of allowing a third party C into an established telephone call between two parties A and B using a directory of accepted third party callers as shown in FIG. 5.

FIG. 6 shows a method 500 of allowing a third party C into an established telephone call between two parties A and B using the directory of accepted third party callers 402 as shown in FIG. 5.

In particular, a telephone call is established between party A and party B in step 502.

In step 504, party A receives call related information regarding party C, e.g., Caller ID information such as a telephone number and/or a household name.

In step 508, the call related information received in step 504 is compared to pre-stored entries in the directory of accepted third party callers 402, and a comparison is performed by the processor 18 between the received call related information regarding party C and each of the pre-stored entries in the directory of accepted third party callers 402. If no match is found, the process 500 ends.

If a match is found, an alerting tone may be provided to the called party A in step 510, providing party A the opportunity to refuse automatic conferencing by party C.

If the automatic conferencing of party C is refused in step 512, then the process 500 ends. However, if the called party A does not refuse the automatic conferencing within, e.g., 3 seconds as depicted in step 514, an accepting signal (e.g., a DTMF tone) will be sent to the central office 13 (FIG. 5) from the telephone 400 (FIG. 5) indicating that the central office 13 may automatically conference in party C. Alternatively, instead of the accepting signal, the telephone 400 may provide a refusal signal (e.g., a DTMF tone) to the central office 13 if the automatic conferencing of party C is refused by the user of the telephone 400.

The present invention can be practiced in addition to conventional three way calling methods, i.e., those that allow a party to an existing call to call out to a third party. Thus, the present invention is equally applicable to three way conferencing which allows a third party caller to either call in to an established telephone call, or to be called by one of the parties in the established telephone call as in conventional three way calling techniques.

Although the invention is described with respect to embodiments of a third caller entering an existing telephone call, the present invention is equally applicable to conferences including more than three callers. For instance, FIGS. 7A to 7H show steps in multiple party conferencing in accordance with the principles of the present invention.

Figure 7A:
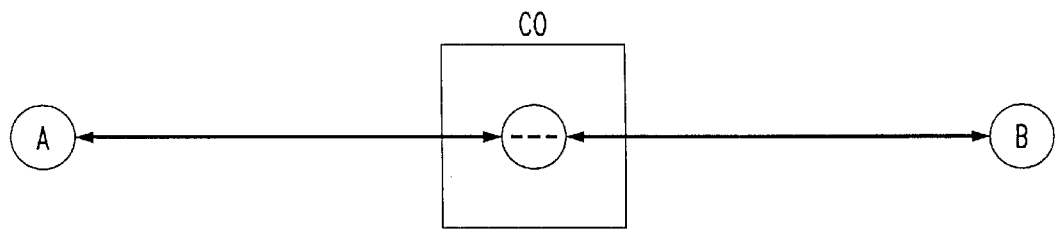
FIGS. 7A to 7H show steps in multiple party conferencing in accordance with the principles of the present invention.
Figure 7B:
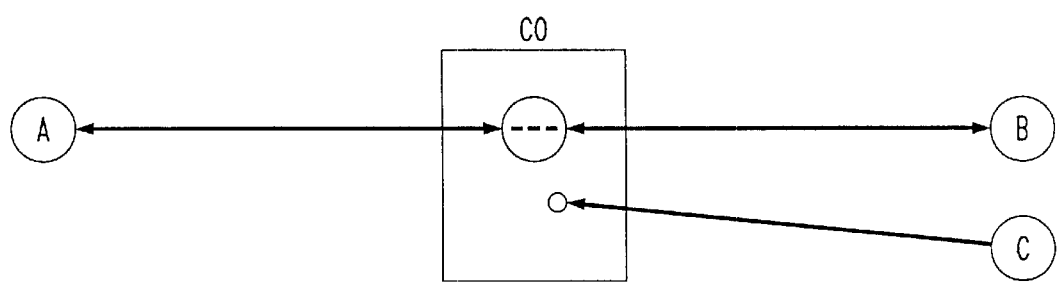
Figure 7C:
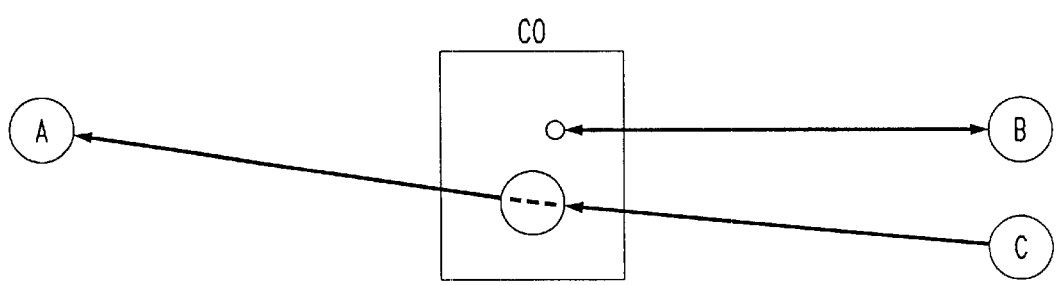
Figure 7D:
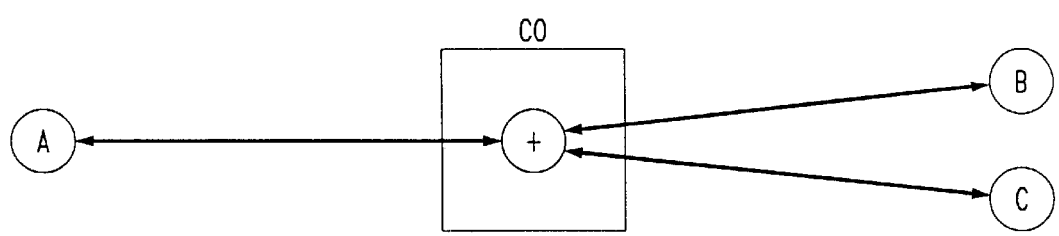
Figure 7E:
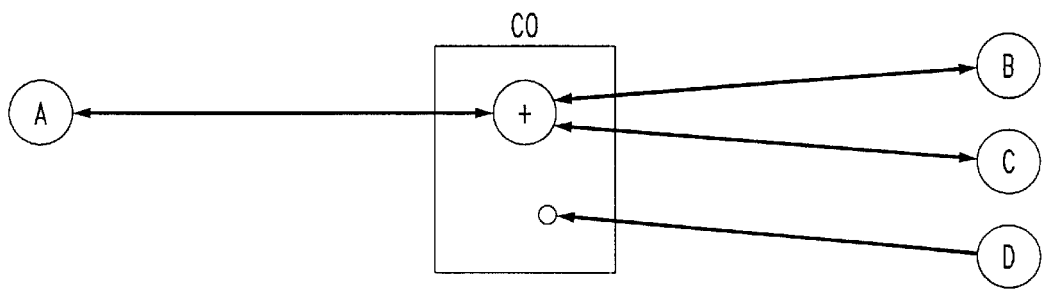
Figure 7F:
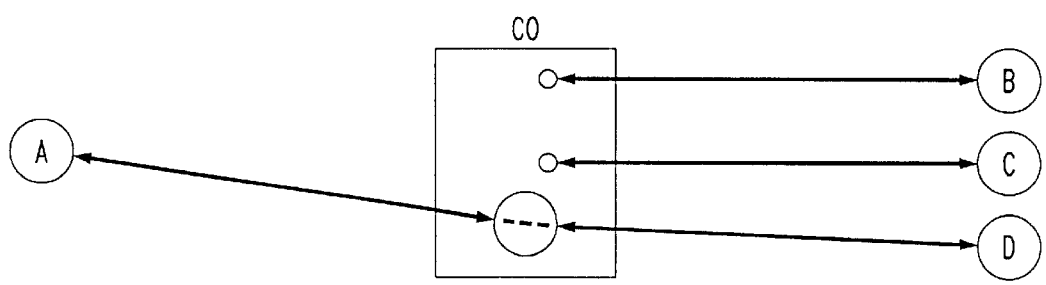
Figure 7G:
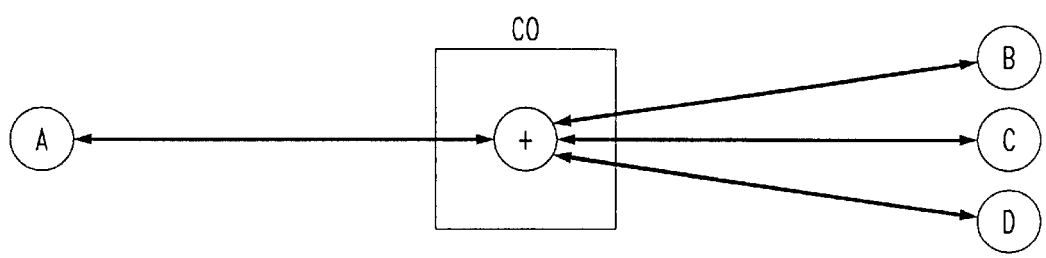
Figure 7H:
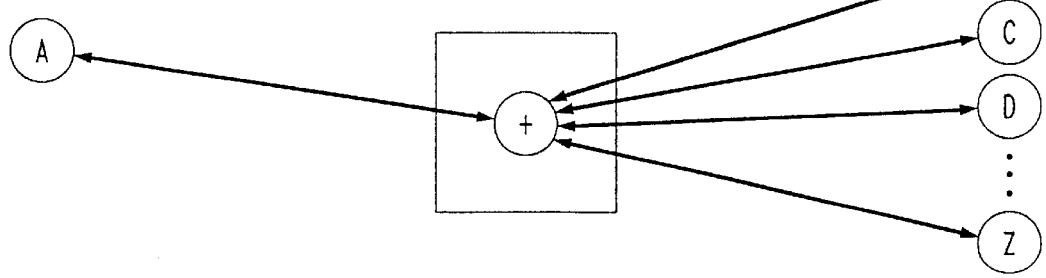
Figure 8:
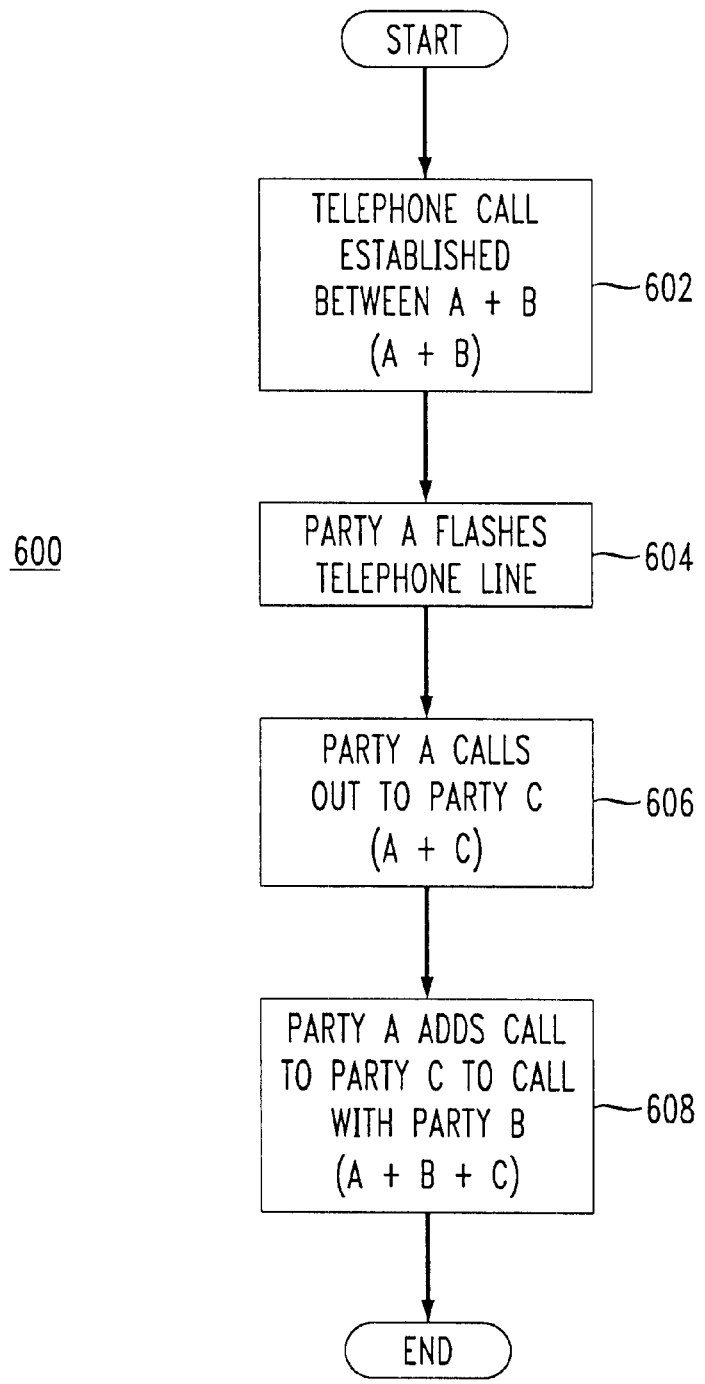
FIG. 8 shows conventional three way conferenced calling wherein a party places a first telephone line on hold, calls or dials a third party, and establishes a three way conferenced call.
Figure 9A:
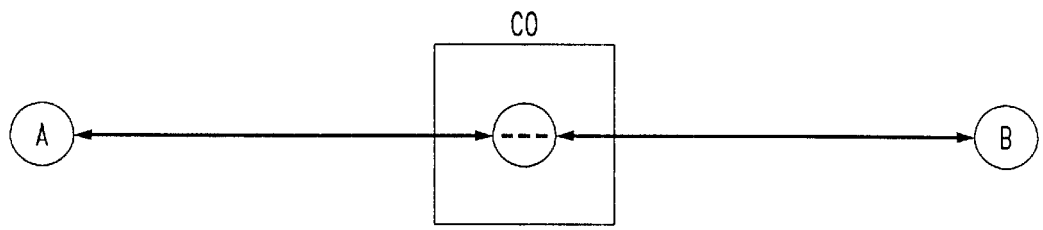
FIGS. 9A to 9C depict the steps in the conventional three way calling shown in FIG. 8.
Figure 9B:
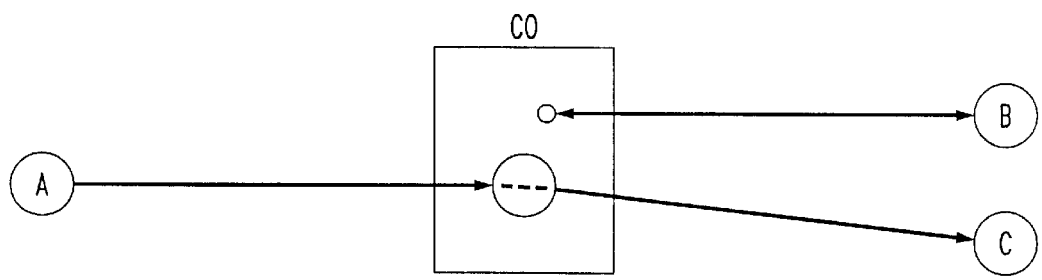
Figure 9C:
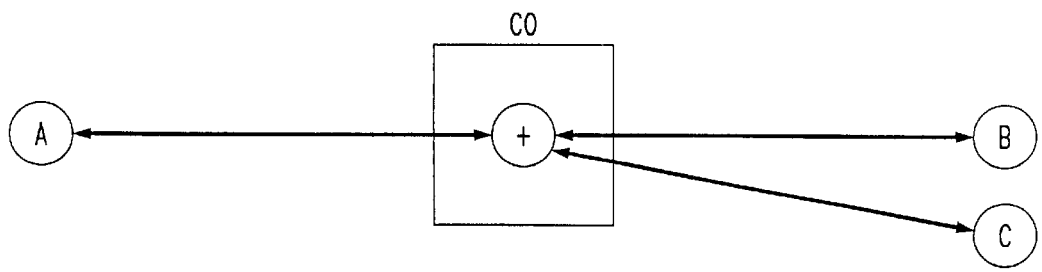

In particular, FIG. 7A shows an establishment of a telephone call between party A and party B. In FIG. 7B, party C calls party A. In FIG. 7C, party A places party B on hold at the central office, and accepts the telephone call from party C. In FIG. 7D, party A adds party B to the telephone call with party C to establish a three way conference between party A, party B and party C as in the other embodiments described herein. However, as shown in FIG. 7E, an additional party, i.e., a fourth party D may call in to the three way conference between party A, party B and party C. In FIG. 7F, party A places party B and party C on hold to receive the call from party D (although, in accordance with the principles of the present invention, party D may be authorized to enter directly into the established conference). In FIG. 7G, the fourth party D is added to the conference. FIG. 7H shows that additional parties may be added to the established conference ad infinitum, e.g., up to party Z.

While the invention has been described with reference to the exemplary embodiments thereof, those skilled in the art will be able to make various modifications to the described embodiments of the invention without departing from the true spirit and scope of the invention.

What is claimed is:

1. A telephone conferencing control apparatus comprising:
   a Caller ID receiver;
   a memory in customer premises equipment adapted to receive at least one entry relating to call related information regarding a third party caller allowed to enter an existing voice telephone call; and
   a processor in said customer premises equipment to compare Caller ID information received by said Caller ID receiver to said at least one entry in said memory, and to allow a third party caller regarding said Caller ID information to enter said existing voice telephone call if a match is determined by said comparison, without requiring intervention by a party to said existing voice telephone call.

2. The telephone conferencing control apparatus according to claim 1, wherein:
   said call related information includes a telephone number.

3. The telephone conferencing control apparatus according to claim 1, wherein:
   said call related information includes a household name.

4. A method of conferencing a third party caller into an existing voice telephone call between a first party and a second party, said method comprising:
   providing Caller ID information of a telephone call from a third party caller to the first party;
   storing in customer premises equipment at least one entry relating to call related information regarding a third party caller allowed to enter an existing voice telephone call;
   comparing in said customer premises equipment Caller ID information regarding said third party caller to said at least one entry in said memory; and
   adding said third party caller to said existing voice telephone call without requiring intervention by said first party if said Caller ID information regarding said third party caller matches said at least one entry in said memory.

5. The method of conferencing a third party caller into an existing voice telephone call according to claim 4, wherein:
   said Caller ID information includes at least a portion of a telephone number.

6. The method of conferencing a third party caller into an existing voice telephone call according to claim 4, wherein:
   said Caller ID information includes at least a portion of a household name.

7. Apparatus for conferencing a third party caller into an existing voice telephone call, comprising:
   means for providing Caller ID information of a telephone call from a third party caller to a called first party already engaged in an existing voice telephone call with a second party;
   means in customer premises equipment for storing at least one entry relating to call related information regarding a third party caller allowed to enter an existing voice telephone call;
   means in said customer premises equipment for comparing Caller ID information regarding said third party caller to said at least one entry in said memory; and
   means in said customer premises equipment for adding said third party caller to said existing voice telephone call at said first party without requiring intervention by said first party if said Caller ID information regarding said third party caller matches said at least one entry in said memory.

8. The apparatus for conferencing a third party caller into an existing voice telephone call according to claim 7, wherein:
   said Caller ID information includes at least a portion of a telephone number.

9. The apparatus for conferencing a third party caller into an existing voice telephone call according to claim 7, wherein:
   said Caller ID information includes at least a portion of a household name.

* * * * *